3,322,855
SHAPED ARTICLES FROM BLENDS OF A POLYVINYL ACETAL AND A POLYMER OF AN ALPHA-METHYL STYRENE
Osamu Fukushima and Yutaka Sakurada, Kurashiki, Japan, assignors to Kurashiki Rayon Company Limited, Kurashiki, Japan, a corporation of Japan
No Drawing. Filed May 24, 1961, Ser. No. 112,195
Claims priority, application Japan, May 30, 1960, 35/25,671
3 Claims. (Cl. 260—874)

This invention relates to a method of manufacturing fibers, films and shaped articles by a suitable proces, such as, dry method, wet method, or semi-melt method from a solution of polymer blend consisting of a polyvinyl alcohol derivative or a copolymer of vinyl alcohol which is insoluble in water but soluble in an organic solvent, and a polymer of vinyl cyclic compound, or a copolymer mainly consisting of vinyl cyclic compound mixed and dissolved in a common solvent.

The principal object of this invention is to manufacture fibers, films and shaped articles having the very excellent hot water resistance, dry heat resistance and elasticity.

In the following description, the invention is mainly described about fibers, but it should be noted that the invention can equally be applied to the manufacture of films and other shaped articles.

Up to the present, synthetic fibers such as, polyvinyl alcohol, polyamide, polyester, and polyacrylic type and the like fibers have already been produced in commercial scale, and the high molecular substance for these synthetic fibers are mostly of crystalline polymers and the fibers naturally consist of crystalline part and non-crystalline part which cooperate to exhibit excellent physical properties as the fiber. In most of the cases, such synthetic fibers are preferably manufactured from a single raw material to exhibit the most splendid physical properties as the fiber and if some different polymers are mixed together at a rate of more than 15 to 20% it is apparent from various facts that the physical properties are lower than those of the fibers obtained from a single raw material due to the decrease of crystallinity or orientation except the improvement in dyeability.

Recently, several patents or reports have been issued concerning the manufacture of fibers or shaped articles by using a mixture of some kinds of polymers, but in almost all of these patents use is made of, as a raw material, crystalline polymer which is the raw material of known synthetic fibers and its object is to improve the physical properties of such known synthetic fibers.

The invention relates to a method of manufacturing absolutely new synthetic fibers different from known synthetic fibers in the structure, in the process of manufacturing and also in the raw material, and is characterised in that polyvinyl alcohol derivatives, or copolymer of vinyl alcohol, which is insoluble in water and soluble in an organic solvent and which is a polymer having no sufficient property by itself alone as the fiber, and a polymer of vinyl cyclic compound, or a copolymer mainly consisting of vinyl cyclic compound are mixed at a rate of more than about 20% to one of the polymer materials, and the mixture of such materials is dissolved in a common solvent to them to provide a spinning solution of polymer blend which is spun by a suitable method, such as, wet process, dry process, or semi-melt process to manufacture fibers. The fiber of polymer blend thus manufactured by the invention shows almost the same physical properties to those of various kinds of synthetic fibers which have been produced in the commercial scale and is rather more excellent in dyeability and elasticity.

Most of the polyvinyl alcohol derivatives which are insoluble in water but soluble in an organic solvent do not show satisfying hot water resistance. Therefore it is difficult to manufacture a synthetic fiber having sufficient properties in practice from such kinds of derivatives alone.

On the other hand, a polymer of vinyl cyclic compound or its copolymer having hydrophobic property and higher second order transition temperature than 100° C., which are particularly important in the invention, has a sufficient hot water resistance as fibers but they are very brittle and have very low elongation. Therefore it is also very difficult to manufacture a synthetic fiber having physical properties similar to those of known practical synthetic fibers by the polymer alone. Since the above defect has been well known and the contrivances for manufacturing synthetic fibers from such polymer alone have not succeeded, the synthetic fibers for clothing could not be manufactured by such polymer alone.

In general, when two kinds of different polymers are mixed and dissolved, and its solution is left for a certain time after the mixing and dissolving, demixing phenomenon occurs. According to the invention it has been found that the demixing of spinning solution of polymer blend can be reduced to the minimum by mixing and dissolving a polyvinyl alcohol derivative and a polymer of vinyl cyclic compound in a common solvent and the ununiformity of the mixed fiber which is considered to be caused by the demixing can not be recognized with naked eye.

It is the most splendid speciality of the invention that the blend of two kinds of high molecular materials which had not been used as the raw material of synthetic fibers having splendid properties due to the fact that they did not show good properties as the fiber by such higher polymer alone is successfully used for the production of entirely new synthetic fibers having superior physical properties to various kinds of synthetic fibres which have been produced in a commercial scale and particularly having splendid elasticity and dyeability. According to the invention it is difficult to produce the new synthetic fibers having such splendid properties by the conditions that there exists a common solvent and the miscibility of two different high molecular substances is good and the spinability of the spinning solution is good only, but there must be more essential conditions in addition to the above conditions in order to attain the above object of the invention, that is, it is particularly important that the polymer or copolymer of vinyl cyclic compound to be used in the invention should have the second order transition temperature higher than 100° C. and this is the basic condition for obtaining a sufficient hot water resistance of the mixed fiber of the invention and moreover, in order to obtain a sufficient dry heat resistance the softening temperature could preferably be higher than 150° C..

Most of the mixed fibers manufactured by mixing more than 20% of a low or high molecular material to the other high molecular material generally show a violent fibrillation which gives a large defect in practice, while the mixed fiber of the invention does not show the troubles due to fibrillation at all and is not inferior in the fibrillation to known synthetic fibers manufactured by a single high molecular material alone.

The reason why the mixed fiber of the invention has such splendid physical properties is assumed to be due to the fact that the property of the polyvinyl alcohol derivative or copolymer of vinyl alcohol is entirely different from the property of the polymer of vinyl cyclic compound or a copolymer mainly consisting of vinyl cyclic compound and the characteristic properties of them are not compensated when the mixture is spun into fibers, but such properties rather additionally cooperate to provide many specialities which could never exhibit in a synthetic fiber consisting of the high molecular substance alone. If, for instance, polyvinyl formal or its derivative is used as the polyvinyl alcohol derivative the single fiber has sufficiently high tensile strength and is very hydrophilic polymer and also has a good dyeability. But when a mixed fiber is produced from above two kinds of polymers, while on the other hand, the polymer of vinyl cyclic compound is a very hydrophobic polymer which is a reverse property and also has a very good elastic property and such properties of each substance are not lost and a fiber of polymer blend having splendid physical properties maintaining the speciality of either of the two substances can be obtained. If, in this case, the mixing ratio of polyvinyl formal is taken to more than 50%, a synthetic fiber having splendid hydroscopic property which could never be obtained in former synthetic fibers can be obtained. The hydroscopic nature is one of the important properties for the fibers to be used for clothing and the improvement of hydroscopic nature without disturbing the other desirable properties of synthetic fibers has been the most important problem which should be solved for the future development of synthetic fibers. According to the invention a synthetic fiber having sufficient hydroscopic nature can be obtained so that the problem has been solved. The dyeability of synthetic fibers has been solved to a certain degree by the selection of color and dyeing condition, or by introducing basic nitrogen, but the fiber of polymer blend of the invention shows very good dyeability to direct color in case when basic nitrogen is not introduced and has practical advantages that the same color or dyeing condition may be adopted as those of known natural fibers. Moreover, when polyvinyl alcohol derivative which contains basic nitrogen, is insoluble in water and soluble in an organic solvent is used the dyeability of the fiber to wool dyestuff is very satisfactory.

As an example of the invention, the physical properties of a sample made by dry spinning a spinning solution of polymer blend consisting of 6 parts of polyvinyl formal having the degree of formalization 65% (the degree of polymerization 1,700) and 4 parts of poly α-methyl styrene (the degree of polymerization 5,000) mixed and dissolved in 6% hydrous dioxane, and drawn 500% in air at 190° C. are shown in the following Table I, wherein the typical properties of synthetic fiber of polyacryl series and polyester series are shown for the sake of comparison.

TABLE I (A) The mixed fiber of the invention
(B) The synthetic fiber of polyacryl series
(C) The synthetic fiber of polyester series

|  | A | B | C |
| --- | --- | --- | --- |
| Denier | 3.25 | 3.50 | 3.00 |
| Dry tensile tenacity (g./d.) | 3.00 | 2.72 | 4.80 |
| Wet tensile tenacity (g./d.) | 2.30 | 2.00 | 4.80 |
| Dry elongation | 25.00 | 40.00 | 18.00 |
| Wet elongation | 25.00 | 42.00 | 18.00 |
| Elastic recovery: |  |  |  |
| 3% | 95 | 90 | 100 |
| 5% | 90 | 85 | 93 |
| Dry softening temperature (° C.) | 200 | 260 | 260 |
| Wet softening temperature (° C.) | 120 | 110 | 125 |
| Moisture regain (percent) | 25–30 | 4–5 | 1–2 |
| Dyeability (mg. dye/g. fiber): |  |  |  |
| Direct color [1] | 19.5 | 0.3 | 0 |
| Disperse color [2] | 19.5 | 2.5 | 0 |

[1] Congo Red (C.I. Direct Red 28).
[2] Diacelliton Fast Brilliant Blue BF (C.I. Disperse Blue 3).
The Dyeing Condition: Dyestuff, 2% (based on the fiber); Temperature at 80° C. for 60 min.

From the above description it will be apparent that the fiber of polymer blend consisting of a polyvinyl alcohol derivative or a copolymer of vinyl alcohol, and a polymer of vinyl cyclic compound or a copolymer mainly consisting of vinyl cyclic compound is a synthetic fiber obtained from an entirely new starting material and possessed many specialities. As the polyvinyl alcohol derivative or the copolymer of vinyl alcohol, which is insoluble in water but soluble in an organic solvent to be used in the invention, use may be made of the acetalization product of polyvinyl alcohol or the mixed acetalization product thereof, by aliphatic or aromatic aldehyde, such as, formaldehyde, acetaldehyde, propionaldehyde, butyraldehyde, β-chloro butyraldehyde, benzaldehyde, chloro-benzaldehyde, dichloro-benzaldehyde, phenyl acetaldehyde, hexahydro-benzaldehyde, 1,2,3,6-tetrahydro-benzaldehyde, the cyanoethylated product of polyvinyl alcohol by acrylonitrile; the urethane compound of polyvinyl alcohol obtained by reacting polyvinyl alcohol with urea, phenyl isocyanate or phenyl urea; a saponification product of copolymer of vinyl ester with ethylene, propylene or vinyl chloride etc., or its acetalization product and the like copolymer of vinyl alcohol.

As the polyvinyl alcohol derivative or the copolymer of vinyl alcohol containing basic nitrogen, use is made of the reaction product of above polyvinyl alcohol derivative with ethylene imine, 1-dimethyl amino-2,3-epoxypropane, or 1-methyl ethyl amino-2,3-epoxy propane etc.; an amino acetalization product of above polyvinyl alcohol derivative with amino-acetaldehyde, methyl amino-acetaldehyde, nonyl amino-acetaldehyde, β-amino-butyraldehyde, β-dimethyl amino acetaldehyde, or β-dimethyl amino-butyraldehyde etc.; or the saponification product of copolymer of vinyl ester with monomer having basic nitrogen, such as, allyl amine, diethyl allyl amine, β-diethyl amino ethyl methacrylate, 2-methyl 5-vinyl pyridine, 4-vinyl pyridine or 2-vinyl pyridine or its quaternary compound by dimethyl sulfate or ethyl bromide etc.; or the additional acetalization product thereof etc. Moreover, the polymer containing group convertible to basic nitrogen may be used by the introduction of basic nitrogen, such as, a copolymer of vinyl acetate and vinyl chloride treated with ammonia liquor to introduce an amino group and to saponify at the same time. As a polyvinyl alcohol derivative or a copolymer of vinyl alcohol containing an acid group use is made of an acetalization product of above polyvinyl alcohol derivative by the aldehyde containing an acid group such as α-sulfoacetaldehyde, β-sulfo-butyraldehyde, or o-sulfo-benzaldehyde etc.; or a saponification product of copolymer of vinyl ester and the monomer containing an acid group such as allyl sulfonic acid, vinyl sulfonic acid, p-styrene, sulfonic acid, or crotonic acid; or the additional acetalization product thereof etc. Moreover the polymer containing group which is convertible to an acid group may be used by the introduction of acid group. For instance, a copolymer of allyl bromide and vinyl acetate saponified with an alkali and reacted with sodium sulfite to introduce sulfonic group may be used. The content of vinyl alcohol unit in copolymer of vinyl alcohol or polyvinyl alcohol derivative should be limited to such an extent that these polymers are insoluble in water and the quantity depends on the hydrophobicity of the hydrophobic portion so that it cannot be defined generally, but usually it is preferable to have vinyl alcohol unit containing less than 90 mol percent of the total vinyl unit.

The polymer of vinyl cyclic compound or a copolymer mainly consisting of vinyl cyclic compound to be used for the invention should preferably have higher second order transition temperature than 100° C., higher softening temperature than 150° C. and hydrophobic property. For instance, as polystyrene and ring-substituted alkyl styrene polymer, use may be made of polystyrene, polyvinyl toluene (poly o-methyl styrene, etc.), poly dimethyl styrene (poly 2,4-dimethyl styrene, poly 2,5-dimethyl styrene etc.); poly trimethyl styrene, poly ethyl styrene, poly isopropyl styrene, poly butyl styrene, poly 2,6-dimethyl-4-tert.butyl styrene, or poly cyclohexyl styrene etc.

As the polymer of halogenized styrene derivative use is made of poly chloro-styrene (poly o-chloro-styrene, poly m-chloro-styrene, poly p-chloro-styrene) poly bromo-styrene, poly dichloro-styrene (poly 2,5-dichloro styrene, poly 2,4-dichloro styrene, etc.,), or poly trichloro styrene etc.; as the poly alkoxy styrene derivative use is made of poly methoxy styrene (poly o-methoxy styrene, poly m-methoxy styrene, poly p-methoxy styrene), poly 2,6-dimethoxy styrene, poly o-ethoxy styrene, or poly 2,5- dimethyl-3,6-dimethoxy styrene etc. As the α-substituted poly styrene and its derivative use is made of poly α-methyl styrene, poly p-methyl α-methyl styrene, poly o-chloro-α-methyl styrene, poly 2,3-dimethyl-α-methyl styrene, poly 3-chloro-2-methyl-α-methyl styrene, poly 2,5-dichloro-α-methyl styrene or poly 2,6-dimethyl-4-tert.-butyl-α-methyl styrene etc. As the poly oxystyrene derivative, use is made of poly hydroxystyrene (poly o-hydroxystyrene, poly m-hydroxystyrene), poly 1,5-dimethyl-2-hydroxystyrene, poly p-acetoxystyrene or poly o-(sec-butyl thiomethyl) styrene etc. As the poly carboxy styrene derivative, poly p-vinyl benzoic acid, poly p-vinyl methyl benzoate may be used. As the poly styrene sulfonic acid and its derivative, poly potassium p-vinyl benzene sulfonate, poly p-vinyl benzene sulfonamide, may be used. As the polymer of polyvinyl biphenyl, polyvinyl naphthalene and similar compound, poly 9-methylene-fluorene, poly phenyl styrene (poly o-phenyl styrene, poly p-phenyl styrene) poly p-cyclohexyl styrene, poly 2,6,2′,5′-tetrachloro-4-4′ divinyl biphenyl, poly 2-vinyl-fluorene, poly α-vinyl naphthalene, poly β-vinyl naphthalene, poly 4-chloro-1-vinyl naphthalene or poly acenaphthylene etc. may be used. Moreover, poly indene, poly coumarone, poly 2-vinyl furan, poly 2-isopropenyl furan, poly 2-vinyl benzofuran or poly 2-vinyl phenoxanthine etc. may also be used. Also the copolymer of two or more of the above described vinyl cyclic compounds, or copolymer of it with acrylic acid ester (such as methyl acrylate, tert.-butylacrylate) its α- and β-substituted compound (such as methyl methacrylate, α-chloro methyl acrylate), acrylonitrile, vinyl chloride, vinylidene chloride, vinyl acetate, ethylene or propylene etc. may be used.

As the solvent for manufacturing the mixed fiber of the invention, the most suitable solvent depends on the kind of polyvinyl alcohol derivative, or copolymer of vinyl alcohol, or polymer of vinyl cyclic compound, or copolymer mainly consisting of vinyl cyclic compound, the degree of polymerization, crystallinity, difference in the spinning method, such as, wet or dry method, or quality of fiber and many other conditions, but use may be made of, for instance, a single or mixed solvent, such as, cyclic ether compound (dioxane, tetrahydro-furan etc.); aliphatic ketone compoud (diethyl ketone, mesityl oxide etc.); cyclic ketone compound (cyclohexanone, isophoron etc.); halogenized hydrocarbon (methylene dichloride, ethylene dichloride, chlorobenzene etc.); aromatic hydrocarbons (benzene, toluene etc.); or dimethyl formamide, dimethyl sulfoxide, or their mixed solvent, or mixed solvent of each of the above described solvent with methanol, isopropanol, water, benzene and methan-with methanol, isopropanol, water, carbon-disulfide, acetonitrile etc. (such as dioxane and water, benzene and methanol, methylene dichloride and metthanol, ethylene dichloride and methanol).

EXAMPLE I

Polyvinyl formal (the degree of polymerization 1,700) of the degree of formalization 65 mol percent and poly α-methyl styrene (the degree of polymerization 4,000) are mixed at the ratio of 6:4 and dissolved in 6% hydrous dioxane until the total polymer concentration of the solution becomes 25% to produce a mixed spinning solution. The mixed spinning solution thus prepared was extruded into air at 170° C. from a spinneret of 0.3 mm. dia. and the fiber thus spun was wound up at a position 4 meters below the spinneret at a speed of 150 m./min. and it was hot drawn for 200% in air at 150° C. and continuously hot drawn for 100% in air at 200° C. The mixed fiber thus obtained showed the tenacity of 2.85 g./d. and the breaking elongation of 26% and had good hot water resistance and dry heat resistance and the dyeability to the direct color and disperse color was very satisfactory.

EXAMPLE II

Polyvinyl formal (the degree of polymerization 2,000) of the degree of formalization of 67 mol percent and poly α-methyl styrene (the degree of polymerization 3,500) were mixed at the ratio of 6:4 and dissolved in 6% hydrous dioxane until the total polymer concentration of the solution becomes 15% to produce a mixed spinning solution.

The mixed spinning solution thus obtained was extruded into an aqueous solution of sodium sulfate 250 g./l. at 70° C. through a spinneret of 0.08 mm. dia., and after the fiber was passed through a coagulating bath for 1.5 meters, it was wound up at a speed of 15 m./min. The fiber was hot drawn for 700% in air at 190° C.

The mixed fiber thus obtained had the tenacity of 3.2 g./d. and breaking elongation of 20%, and its hot water resistance and dry heat resistance were similar to those as shown in Table I and dyeability to direct color and disperse color was very satisfactory.

EXAMPLE III

Polyvinyl acetal (the degree of polymerization 2,000) acetalized with β-amino butyraldehyde and formaldehyde respectively and having the degree of acetalization of 2 mol percent and 60 mol percent respectively and poly α-methyl styrene (the degree of polymerization 7,000) were mixed at the ratio of 5:5 and dissolved in 7% hydrous dioxane until the total polymer concentration of the solution becomes 23% and provided a mixed spinning solution.

The mixed spinning solution thus obtained was spun and hot drawn in the similar manner to Example I, the mixed fiber thus obtained had physical properties similar to those shown in Table I and the dyeability was very satisfactory to direct color and also to the acid color.

EXAMPLE IV

The polyvinyl formal same as in Example I and poly α-methyl styrene were mixed at the ratio of 5:5 and dissolved in a mixed solvent of ethylene dichloride and methyl alcohol at a ratio of 80:20 until the total polymer concentration becomes 25% and the solution was spun and hot drawn in the similar manner to Example I. The mixed fiber thus obtained showed the physical properties same as those shown in Table I.

EXAMPLE V

The polyvinyl formal (the degree of polymerization 2,500) containing 10 mol percent of vinyl acetate and having the degree of formalization 66 mol percent and poly dichlorostyrene (the degree of polymerization 3,500) were mixed at the ratio of 5:5 and dissolved in dioxane until the total polymer concentration of solution becomes 15% to provide a mixed spinning solution.

The mixed spinning solution was spun in the same manner as in Example II, and the fiber was hot drawn for 800% in air at 190 C. and afterwards subjected to 10% hot shrinking in air at 200° C. The mixed fiber thus obtained showed the physical properties same as those shown in Table I.

EXAMPLE VI 5 parts of polyvinyl formal (the degree of polymerization 2,500) of the degree of formalization 67 mol percent and 5 parts of a copolymer (the degree of polymerization 3,000) of styrene and maleic anhydride of 50:50 were mixed and dissolved in 6% hydrous dioxane until the total polymer concentration became 15% and the mixed spinning solution thus obtained was spun under the same condition as in Example II and the fiber thus obtained was hot drawn for 500% in water at 100° C. The mixed fiber thus obtained had a very splendid tenacity and heat resistance.

EXAMPLE VII

A mixed spinning solution same as in Example VI was spun in the same condition and continuously cold drawn for 400% and then wound up. The mixed fiber thus obtained without subjecting to heat-treatment showed the tenacity of 2.5 g./d. and breaking elongation of 40% and good hot water resistance and dyeability.

EXAMPLE VIII

Polyvinyl formal (the degree of polymerization 2,000) of the degree of formalization 72 mol percent and poly α-methyl styrene (the degree of polymerization 4,000) were mixed at the ratio of 6:4 and dissolved in a mixed solvent of benzene and methyl alcohol at the ratio of 80:20 and the solution was spun in the similar manner as in Example I and the fiber was hot drawn 150% in air at 130° C. and then hot drawn 200% in air at 190° C.

EXAMPLE IX 6 parts of polyvinyl benzal (the degree of polymerization 2,000) having the degree of benzalization 35 mol percent and 4 parts of poly α-methyl styrene (the degree of polymerization 3,000) were mixed and dissolved in a mixed solvent of ethylene dichloride and methyl alcohol at the ratio of 80:20 until the total polymer concentration of solution became 25% to provide a mixed spinning solution. The mixed spinning solution was extruded through a spinneret of 0.2 mm. dia. into air at 150° C. and the fiber was wound up at the speed of 200 m./min. at a point 5 meters below the spinneret and was 400% hot drawn between hot rollers at 200° C. continuously and then wound up at a speed of 1,000 m./min. The mixed fiber thus obtained showed the physical properties same as those in Table I.

EXAMPLE X

The saponification product (the degree of polymerization 2,000) of copolymer consisting of 3:7 of ethylene and vinyl acetate and a copolymer consisting of 7:3 of styrene and vinyl naphthalene respectively were mixed at the ratio of 1:1 and dissolved in a mixed solvent of benzene and methyl alcohol at the ratio of 80:20 until the total polymer concentration became 25% and the solution was spun under the same condition as in Example IX.

The filament thus obtained was 600% hot drawn in woods metal at 190° C. and then subjected to 5% hot shrinking in air at 200° C. The mixed fiber thus obtained showed the same physical properties as those shown in Table I.

EXAMPLE XI

Polyvinyl butyral (the degree of polymerization 1,500) having the degree of acetalization 45 mol percent and polyvinyl toluene (the degree of polymerization 2,000) were mixed at the ratio of 7:3 and dissolved in dimethyl sulfoxide until the total polymer concentration became 15% and the solution was extruded through a spinneret of 0.08 mm. dia. into an aqueous solution containing 50% sodium acetate and the fiber after passing through the coagulating bath for 2 meters was wound up at a speed of 10 m./min. The fiber was 500% hot drawn in air at 190° C. and also subjected to heat-treatment under a constant length in air at 190° C.

EXAMPLE XII

Polyvinyl benzal (the degree of polymerization 1,700) of the degree of benzalization 40 mol percent containing 0.2% of basic nitrogen acetalized with α-dimethyl amino acetaldehyde and a copolymer (the degree of polymerization 3,000) consisting of α-methyl styrene and methyl methacrylate at the ratio of 7:3 were mixed at the ratio of 6:4 and dissolved in 5% hydrous tetra hydrofuran until the concentration of solution became 20% to provide a mixed spinning solution. The solution was spun under the same condition as in Example IX and the fiber was 200% hot drawn in air at 250° C. and then 100% hot drawn in air at 210° C.

EXAMPLE XIII

Cyanoethylated polyvinyl alcohol (the degree of polymerization 2,000) having the degree of etherification of 51 mol percent and poly α-methyl styrene (the degree of polymerization 5,000) were mixed at a ratio of 1:1 and dissolved in 6% hydrous dioxane until the total polymer concentration of solution became 25% and the solution was spun under the same condition as in Example I and fiber was spun and hot drawn.

EXAMPLE XIV

Polyvinyl formal (the degree of polymerization 1,700) having the degree of formalization of 65 mol percent, poly α-methyl styrene (the degree of polymerization 3,000) and a copolymer (the degree of polymerization 2,500) consisting of styrene and maleic anhydride at the ratio of 50:50 were mixed at the ratio of 5:3:2 respectively and dissolved in 6% hydrous dioxane until the total polymer concentration of solution became 15% and the solution was spun under the same condition as in Example II and the fiber was 200% hot drawn in air at 170° C., then also 150% hot drawn in air at 200° C. The mixed fiber thus obtained showed a tenacity of 3.5 g./d. and breaking elongation of 23% and the heat resistance property of 200° C. and other physical properties were same as those shown in Table I.

What we claim is:

1. A shaped article of mixed polymers having excellent physical and dyeing properties comprising (1) from about 50% to about 70% by weight of polymer consisting of vinyl alcohol units, said polymer having been rendered insoluble in water but soluble in an organic solvent by reacting 10% to 90% of said vinyl alcohol units with an aldehyde selected from the group consisting of formaldehyde, butyraldehyde and benzaldehyde and (2) from about 30% to about 50% by weight of a hydrophobic polymer having a second order transition temperature higher than 100° C. and a softening temperature higher than 150° C., said latter polymer being a polymer of a monomer consisting essentially of α-methyl styrene or a polymer of a monomer consisting essentially of α-methyl styrene containing an alkyl substituent in the aromatic ring.

2. The shaped article according to claim 1 which is a fiber.

3. The fiber according to claim 2 in which the polymers are polyvinyl formal and poly-α-methyl styrene.

References Cited

UNITED STATES PATENTS

| | | | |
|---|---|---|---|
| 2,284,839 | 6/1942 | Paine | 264—184 |
| 2,337,398 | 12/1943 | Marsh et al. | 264—184 |
| 2,571,683 | 10/1951 | Coover et al. | 260—898 |
| 2,597,624 | 5/1952 | Drisch et al. | 264—195 |
| 2,657,191 | 10/1953 | Coover et al. | 260—898 |
| 2,666,042 | 1/1954 | Nozaki | 260—874 |
| 2,686,103 | 8/1954 | Charch | 264/195 |
| 2,906,594 | 9/1959 | Osugi et al. | 264—210 |
| 2,977,183 | 3/1961 | Osugi et al. | 264—78 |
| 3,090,769 | 5/1963 | Coover et al. | 260—897 |
| 3,102,869 | 9/1963 | Coover et al. | 260—874 |
| 3,121,607 | 2/1964 | Ohno et al. | 260—874 |

MURRAY TILLMAN, *Primary Examiner.*

M. V. BRINDISI, DONALD E. CZAJA, G. F. LESMES, J. A. KOLASCH, C. B. HAMBURG,
*Assistant Examiners.*

UNITED STATES PATENT OFFICE

CERTIFICATE OF CORRECTION

Patent No. 3,322,855                             May 30, 1967

Osamu Fukushima et al.

It is hereby certified that error appears in the above numbered patent requiring correction and that the said Letters Patent should read as corrected below.

Column 1, line 12, for "proces" read -- process --; column 5, lines 51 and 52, strike out "benzene and methan- with methanol, isopropanol, water,"; line 54, for "metthanol" read -- methanol --; column 8, line 35, after "of" insert -- a --.

Signed and sealed this 25th day of June 1968.

(SEAL)
Attest:

Edward M. Fletcher, Jr.                            EDWARD J. BRENNER
Attesting Officer                                     Commissioner of Patents